United States Patent
Darrah et al.

(10) Patent No.: US 6,694,207 B2
(45) Date of Patent: Feb. 17, 2004

(54) SELECTIVE LASER SINTERING WITH INTERLEAVED FILL SCAN

(75) Inventors: James F. Darrah, Austin, TX (US); Xiaoshu Zu, Austin, TX (US)

(73) Assignee: 3D Systems, Inc., Valencia, CA (US)

(*) Notice: Subject to any disclaimer, the term of this patent is extended or adjusted under 35 U.S.C. 154(b) by 0 days.

(21) Appl. No.: 10/205,698

(22) Filed: Jul. 26, 2002

(65) Prior Publication Data
US 2003/0028278 A1 Feb. 6, 2003

(30) Foreign Application Priority Data
Jul. 31, 2001 (GB) .............................................. 0118652

(51) Int. Cl.$^7$ .............................................. G06F 19/00
(52) U.S. Cl. .................. 700/119; 700/118; 219/121.64; 264/497
(58) Field of Search ...................... 219/121.69; 700/118, 700/119; 264/497, 125; 419/31; 156/272.8

(56) References Cited

U.S. PATENT DOCUMENTS

| | | | |
|---|---|---|---|
| 4,247,508 A | | 1/1981 | Housholder |
| 4,863,538 A | | 9/1989 | Deckard |
| 4,944,817 A | | 7/1990 | Bourell et al. |
| 5,017,753 A | | 5/1991 | Deckard |
| 5,076,869 A | | 12/1991 | Bourell et al. |
| 5,132,143 A | | 7/1992 | Deckard |
| 5,155,324 A | * | 10/1992 | Deckard et al. ....... 219/121.64 |
| 5,352,405 A | | 10/1994 | Beaman et al. |
| 5,382,308 A | * | 1/1995 | Bourell et al. ........... 156/272.8 |
| 5,437,820 A | * | 8/1995 | Brotz ......................... 264/497 |
| 5,609,813 A | | 3/1997 | Allison et al. |
| 5,640,667 A | * | 6/1997 | Freitag et al. ................ 419/31 |
| 5,711,911 A | | 1/1998 | Hull |
| 5,904,890 A | * | 5/1999 | Lohner et al. .............. 700/119 |
| 6,085,122 A | | 7/2000 | Manning |
| 6,151,345 A | | 11/2000 | Gray |

FOREIGN PATENT DOCUMENTS

WO    WO 98/56566    12/1998

* cited by examiner

Primary Examiner—Albert W. Paladini
(74) Attorney, Agent, or Firm—Rod Anderson; Mike Ervin; Ralph D'Alessandro

(57) ABSTRACT

A computer-controlled apparatus and method for fabricating three-dimensional articles in layerwise fashion is disclosed. Upon dispensing a layer of a fusible powder, a laser irradiates selected locations of that layer to fuse the powder into a cross-section of the article to be formed in that layer, such that the fused cross-sections fuse together into the article. The laser is controlled in a raster scan fashion across the selected locations of the powder layer. The parallel raster scan lines are separated from one another, centerline-to-centerline, according to a selected pitch, or fill scan spacing value. The positions of the parallel scan lines are determined with respect to a coordinate system at the powder layer, rather than with respect to boundaries of the cross-section being formed; in alternating layers, the parallel scan lines are offset from one another by one-half the pitch. This arrangement of the scan lines optimizes the structural strength of the article being formed, while minimizing the number of scans required to form the article.

17 Claims, 5 Drawing Sheets

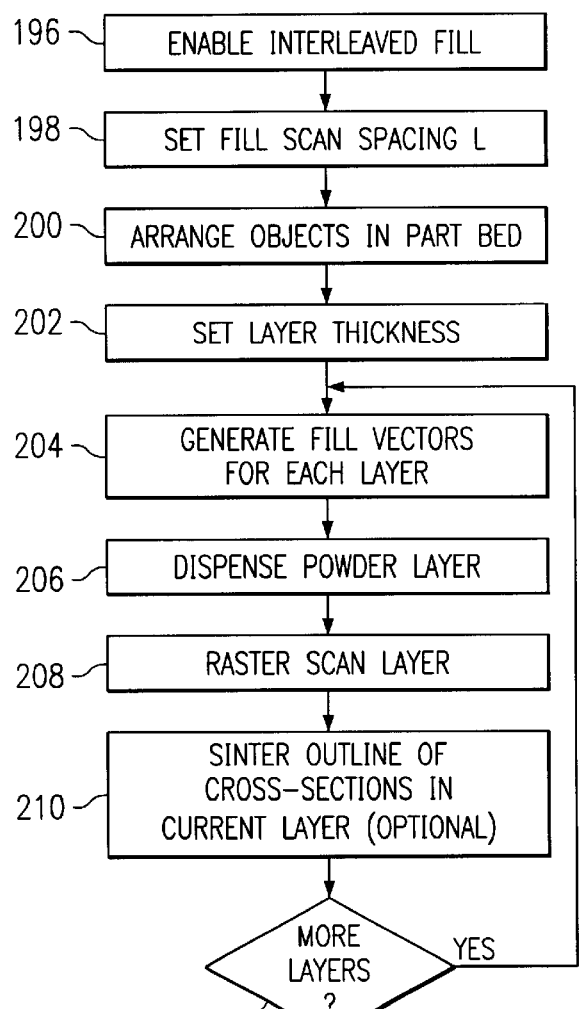
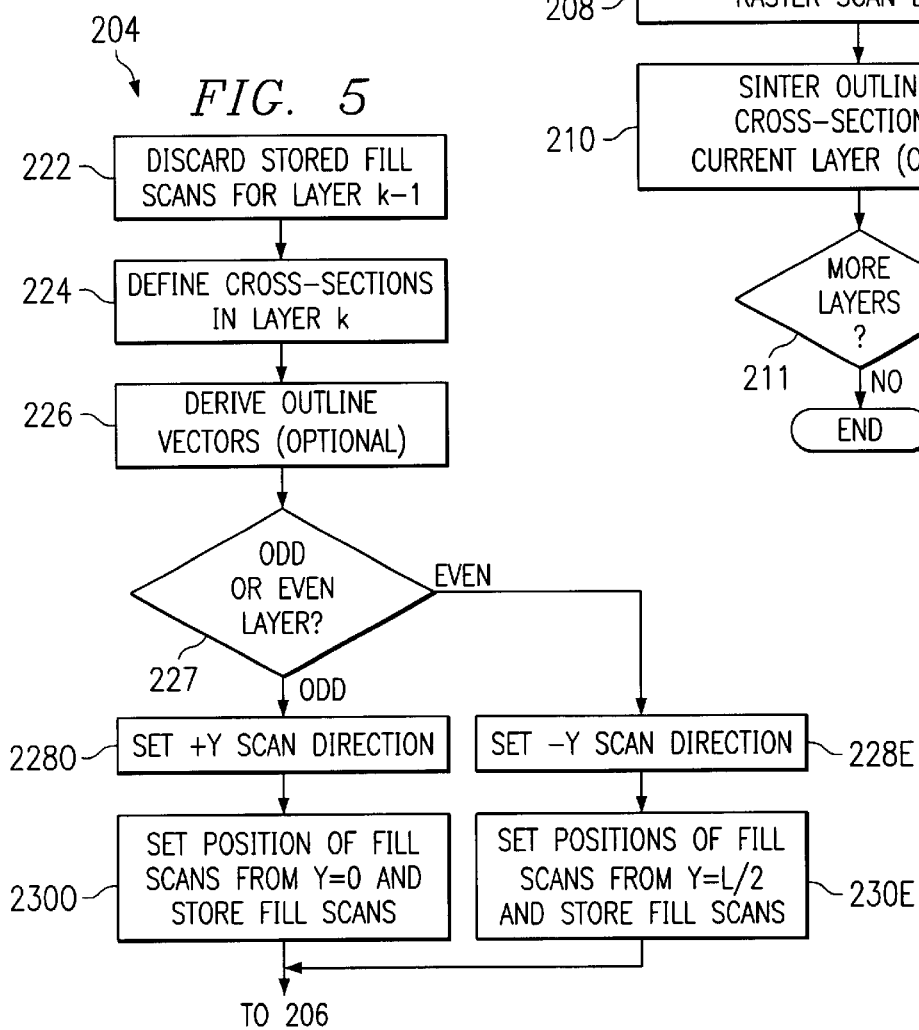

SELECTIVE LASER SINTERING WITH INTERLEAVED FILL SCAN

CROSS-REFERENCE TO RELATED APPLICATIONS

This application is related to co-pending and commonly assigned application Ser. No. 10/206,647 entitled "Selective Laser Sintering With Optimized Raster Scan Direction", filed contemporaneously with this application, and incorporated herein by this reference.

STATEMENT REGARDING FEDERALLY SPONSORED RESEARCH OR DEVELOPMENT

Not applicable.

BACKGROUND OF THE INVENTION

This invention is in the field of rapid prototyping, and is more specifically directed to the fabrication of three-dimensional objects by selective laser sintering.

The field of rapid prototyping of parts has, in recent years, made significant improvements in providing high strength, high density, parts for use in the design and pilot production of many useful articles. "Rapid prototyping" generally refers to the manufacture of articles directly from computer-aided-design (CAD) data bases in an automated fashion, rather than by conventional machining of prototype articles according to engineering drawings. As a result, the time required to produce prototype parts from engineering designs has been reduced from several weeks to a matter of a few hours.

By way of background, an example of a rapid prototyping technology is the selective laser sintering process practiced in systems available from 3D Systems, Inc. of Valencia, Calif., in which articles are produced from a laser-fusible powder in layerwise fashion. According to this process, a thin layer of powder is dispensed and then fused, melted, or sintered, by laser energy that is directed to those portions of the powder corresponding to a cross-section of the article. Conventional selective laser sintering systems, such as the SINTERSTATION 2500plus system available from 3D Systems, Inc., position the laser beam by way of galvanometer-driven mirrors that deflect the laser beam. The deflection of the laser beam is controlled, in combination with modulation of the laser itself, to direct laser energy to those locations of the fusible powder layer corresponding to the cross-section of the article to be formed in that layer. The laser may be scanned across the powder in raster fashion, with modulation of the laser effected in combination therewith, or the laser may be directed in vector fashion. In some applications, cross-sections of articles are formed in a powder layer by fusing powder along the outline of the cross-section in vector fashion either before or after a raster scan that "fills" the area within the vector-drawn outline. In any case, after the selective fusing of powder in a given layer, an additional layer of powder is then dispensed, and the process repeated, with fused portions of later layers fusing to fused portions of previous layers (as appropriate for the article), until the article is complete.

Detailed description of the selective laser sintering technology may be found in U.S. Pat. Nos. 4,863,538, 5,132,143, and 4,944,817, all assigned to Board of Regents, The University of Texas System, and in U.S. Pat. No. 4,247,508 assigned to 3D Systems, Inc., all incorporated herein by this reference. Laser power control systems for selective laser sintering systems are described in U.S. Pat. No. 6,085,122, issued Jul. 4, 2000, and in U.S. Pat. No. 6,151,345, issued Nov. 21, 2000, both assigned to 3D Systems, Inc., and also incorporated herein by reference. By way of further background, U.S. Pat. No. 5,352,405, issued Oct. 4, 1994 assigned to 3D Systems, Inc., and incorporated herein by reference, describes a method of scanning the laser across the powder in a selective laser sintering apparatus to provide a uniform time-to-return of the laser for adjacent scans of the same region of powder, thus providing uniform thermal conditions over the cross-section of each of multiple parts within the same build cylinder.

The selective laser sintering technology has enabled the direct manufacture of three-dimensional articles of high resolution and dimensional accuracy from a variety of materials including polystyrene, NYLON, other plastics, and composite materials such as polymer coated metals and ceramics. Polystyrene parts may be used in the generation of tooling by way of the well-known "lost wax" process. In addition, selective laser sintering may be used for the direct fabrication of molds from a CAD database representation of the object to be molded in the fabricated molds; in this case, computer operations will "invert" the CAD database representation of the object to be formed, to directly form the negative molds from the powder.

FIG. 1 illustrates, by way of background, the construction and operation of a conventional selective laser sintering system 100. As shown in FIG. 1, selective laser sintering system 100 includes a chamber 102 (the front doors and top of chamber 102 not shown in FIG. 1, for purposes of clarity). Chamber 102 maintains the appropriate temperature and atmospheric composition (typically an inert atmosphere such as nitrogen) for the fabrication of the article.

The powder delivery system in system 100 includes feed piston 114, controlled by motor 116 to move upwardly and lift a volume of powder into chamber 102. Two powder pistons 114 may be provided on either side of part piston 106, for purposes of efficient and flexible powder delivery, as used in the SINTERSTATION 2500 plus system available from 3D Systems, Inc. Part piston 106 is controlled by motor 108 to move downwardly below the floor of chamber 102 by a small amount, for example 0.125 mm, to define the thickness of each layer of powder to be processed. Roller 118 is a counter-rotating roller that translates powder from feed piston 114 to target surface 104. Target surface 104, for purposes of the description herein, refers to the top surface of heat-fusible powder (including portions previously sintered, if present) disposed above part piston 106; the sintered and unsintered powder disposed on part piston 106 will be referred to herein as part bed 107. Another known powder delivery system feeds powder from above part piston 106, in front of a delivery apparatus such as a roller or scraper.

In conventional selective laser sintering system 100 of FIG. 1, a laser beam is generated by laser 110, and aimed at target surface 104 by way of scanning system 142, generally including galvanometer-driven mirrors that deflect the laser beam. The deflection of the laser beam is controlled in combination with modulation of laser 110 itself, to direct laser energy to those locations of the fusible powder layer corresponding to the cross-section of the article to be formed in that layer. Scanning system 142 may scan the laser beam across the powder in a raster-scan fashion, or in vector fashion. Cross-sections of articles are often formed in a powder layer by scanning the laser beam in vector fashion along the outline of the cross-section in combination with a raster scan that "fills" the area within the vector-drawn outline.

Referring now to FIGS. 2a through 2c, the relationship of successive fill scans among multiple parts in the same build cylinder, and among successive scanned layers, in conventional selective laser sintering processes will be described. FIG. 2a is a plan schematic view of a portion of a layer of powder at target surface 104 at which cross-sections 152a, 154a, 156a, are being formed in the current layer of powder, for three different parts or objects being fabricated in the build cycle. These cross-sections 152a, 154a, 156a are formed, in this example, by a combination of vector outlining and raster scan fills, as discussed above. As shown in the cross-sectional view of FIG. 2c, vector outline scans 160 define the outer boundaries of each of cross-sections 152a, 154a, 156a, and fill scans 162 fill the interior of each of cross-sections 152a, 154a, 156a in a raster scan manner. The vector outlines 160 are not shown in FIG. 2a (and FIG. 2b), for the sake of clarity. FIG. 2b illustrates, in plan view, the scanning of cross-sections 152b, 154b, 156b in the next layer of powder.

As shown in FIGS. 2a through 2c, the rastering of fill scans 162 are carried out in an "x-fast" manner, in which each scan of the laser beam is parallel to the x-axis. Conversely, the "slow" axis in this example is the y-axis, as the scan path is incremented in the y-direction after completion of each x-direction scan. Typically, the direction in which the scans increment alternate from layer to layer. In this example, the slow axis direction in cross-sections 152a, 154a, 156a (FIG. 2a) is the +y direction, while the slow axis direction in the next cross-sections 152b, 154b, 156b (FIG. 2b) is the −y direction.

The spacing between adjacent fill scans 162 is defined by a distance L between adjacent fill scans 162, as shown in FIGS. 2a and 2c. Distance L, or at least its maximum specification value, is defined according to a tradeoff between structural strength of the sintered article (which increases with decreasing L) and the speed of manufacturing (which of course increases with increasing L). It is contemplated that distance L will depend upon the particular application of the resulting article, upon the specific powder material used, and other factors.

The spacing between adjacent fill scans 162 of course only partially defines the location of scans 162; the absolute positioning of fill scans 162 within a layer also depends upon the location of the initial scan in the cross-section. According to this conventional method, the position of fill scans 162 within a given cross-section 152a, 154a, 156a is determined relative to the outer boundary of that cross-section, and depends upon distance L. This positioning is based on the outer boundary, even if this outer boundary is not vector traced by the laser beam. FIG. 2c illustrates, for cross-section 154a in which the slow axis incremental direction is the +y direction, that the first fill scan is set at a position that is distance L from the right-most vector scan 160 (measured centerline-to-centerline). Each successive fill scan 162 in cross-section 154a is then separated by distance L from the previous fill scan 162 (also measured centerline-to-centerline), continuing until the last fill scan 162 is made within cross-section 154a. In FIG. 2c, fill scans 162 are shown schematically in a non-overlapping manner for clarity; actually, adjacent fill scans 162 will overlap one another so that the powder at adjacent fill scans 162 will fuse together into a mass.

Referring back to FIG. 2a, the definition of the position of fill scans 162 within cross-sections 152a, 154a, 156a based upon the boundaries of each cross-section results in the fill scans 162 not necessarily aligning collinearly with one another. For example, fill scans 162 of cross-section 154a are offset, in the y-dimension, from fill scans 162 of cross-sections 152a, 156a. As evident from FIG. 2a, this offset among cross-sections 152a, 154a, 156a causes a large number of scan lines to be traced in the fabrication of these articles.

Referring now to FIG. 2b, according to this conventional method, cross-sections 152b, 154b, 156b are next formed, after the dispensing and spreading of the next layer of powder over that in which cross-sections 152a, 154a, 156a were formed. Cross-sections 152b, 154b, 156b are then formed by way of vector scans 160 (FIG. 2c) and fill scans 162. In this example, as shown in FIG. 2c, cross-sections 152b, 154b, 156b are identical (in the x and y dimensions) to cross-sections 152a, 154a, 156a, and as such vector scans 160 overlie one another in these two layers.

However, as noted above, the direction of slow axis incrementing is opposite for cross-sections 152b, 154b, 156b relative to cross-sections 152a, 154a, 156a. In this example, cross-sections 152b, 154b, 156b are incremented in the −y direction, while cross-sections 152a, 154a, 156a are incremented in the +y direction. As shown in FIG. 2c, the first fill scan 162 proceeding from the left-most vector scan 160 along the −y axis is separated from this vector scan 160 by distance L. Each successive fill scan 162 is then separated from the preceding fill scan 162 by distance L, as in the previous case of cross-sections 152a, 154a, 156a.

It has also been observed, in connection with this invention, that this conventional definition of the location of fill scans 162 based upon the outer boundaries results in fill scans 162 that have no relation to one another, when considered among layers. For example, as evident from FIG. 2c, the spacing between a fill scan 162 in an upper layer and the adjacent fill scans 162 in the layer immediately below is not uniform. In the example of FIG. 2c, fill scan 162 in cross-section 154b, is separated from one adjacent fill scan 162 in cross-section 154a by a distance $d_1$, and from the other adjacent fill scan 162 in cross-section 154a by a distance $d_2$ that is much smaller than distance $d_1$. The strength of bonding between cross-sections 154a, 154b is therefore limited by the larger distance $d_1$. The worst case of this spacing will occur when fill scans 162 in adjacent layers exactly line up with one another, such that distance $d_2$ will be at a minimum and distance $d_1$ will be at a maximum.

Through geometric analysis, it has been observed, in connection with the invention, that the distance L between adjacent scans in the same layer defines the maximum possible distance $d_1$ that may occur in the fabrication of a given article. Conversely, the structural strength of the sintered article, which depends in large part on the maximum distance $d_1$ between adjacent fill scans 162 in adjacent layers, limits the spacing distance L between fill scans 162 in the same layer. In order to guarantee the desired structural strength, the spacing distance L must be selected assuming the worst case condition of fill scans 162, namely where fill scans 162 in successive layers overlie one another. However, many articles will be formed in which the worst case condition is not present, and therefore the actual distances $d_1$ will be less than the maximum. In these cases, therefore, the spacing distance L between fill scans 162 in the same layer, defined according to the worst case condition, will be smaller than necessary, resulting in a longer build time for each cross-section of the article than is necessary to achieve proper structural strength.

By way of further background, U.S. Pat. No. 5,711,911 describes numerous techniques for ordering vector scans in the formation of an object from a liquid photopolymer by way of stereolithography. The techniques disclosed in this document address various limitations in the texture and thickness of photocured liquids. One of these disclosed techniques involves the interleaving of scans within the same layer of liquid photopolymer. Specifically, the reference discloses a layer of liquid photopolymer that is scanned, in a first pass, using non-consecutive fill scan vectors; a second pass completes the photoexposing process by scanning those scan lines between the scans of the first pass.

BRIEF SUMMARY OF THE INVENTION

It is therefore an object of the present invention to provide a method of fabricating one or more articles by selective laser sintering in which the build time in each layer is minimized.

It is a further object of the present invention to provide such a method in which the structural strength of the fabricated articles is not degraded despite a reduction in the number of fill scans.

It is a further object of the present invention to provide such a method in which the structural strength of the fabricated articles is uniform.

Other objects and advantages of the present invention will be apparent to those of ordinary skill in the art having reference to the following specification together with its drawings.

The present invention may be implemented into the selective laser sintering of a three-dimensional article, in which the article is formed in layerwise fashion by the sintering, or melting and resolidification, of a powder. According to this invention, the cross-sections of the articles formed in a given layer are raster-scanned, with a selected line-to-line spacing between fill scans, and beginning from an arbitrary position in the layer. In the next layer of powder that is dispensed over the prior layer, the cross-sections of the articles are raster-scanned with the same spacing, but with the location of the scan lines substantially centered between the locations of the scan lines in the previous layers. By locating scan lines in successive layers relative to one another, rather than relative to the boundaries of the object cross-section in that layer, the number of scans required for the formation of the article or articles can be reduced, perhaps by as much as a factor of two, without degrading the structural strength of the article so formed.

BRIEF DESCRIPTION OF THE SEVERAL VIEWS OF THE DRAWING

FIG. 4 is a flow diagram illustrating a method of selective laser sintering according to the preferred embodiment of the invention.

FIG. 5 is a flow diagram illustrating the generation of vectors for cross-sections of articles to be built in the method of selective laser sintering according to the preferred embodiment of the invention.

DETAILED DESCRIPTION OF THE INVENTION

Figure 1:
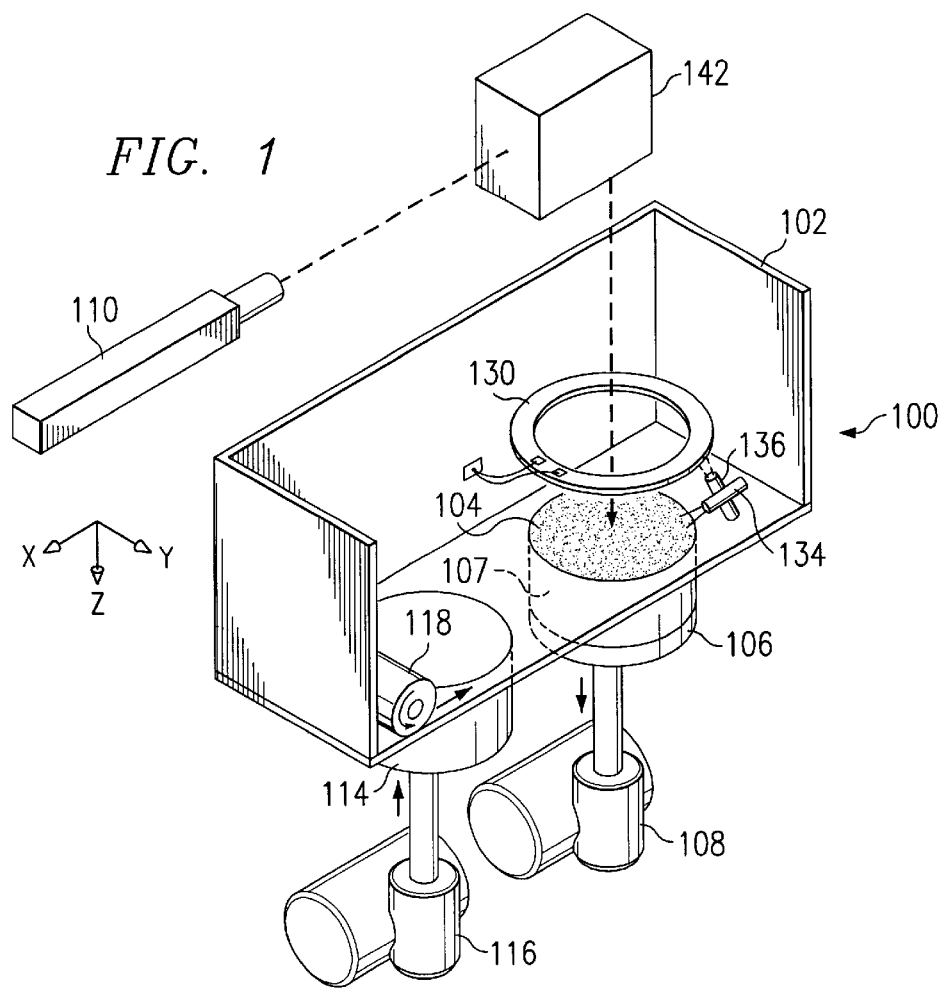
FIG. 1 is a schematic diagram, in perspective view, of a conventional selective laser sintering apparatus.
Figure 2A:
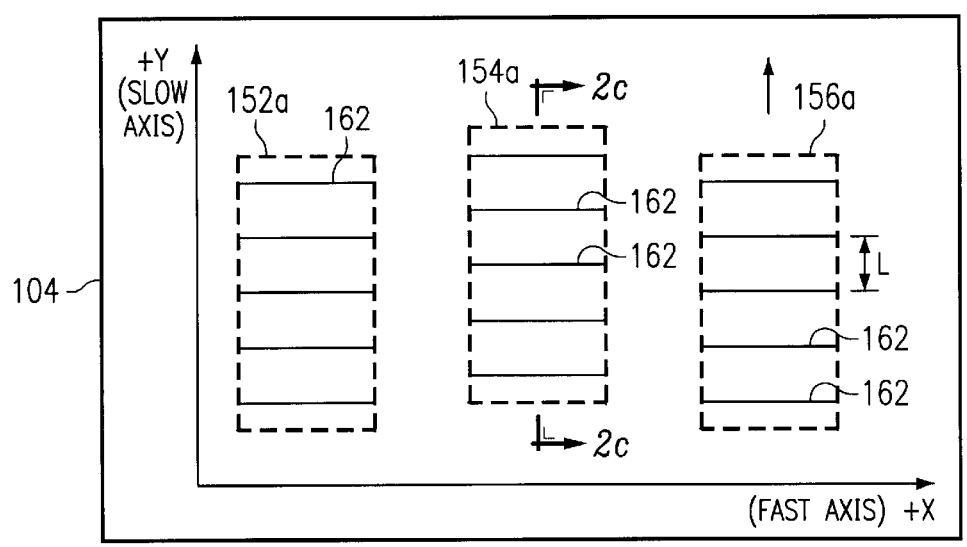
FIGS. 2a and 2b are plan views that schematically illustrate the scanning of successive layers of powder in conventional selective laser sintering.
Figure 2B:
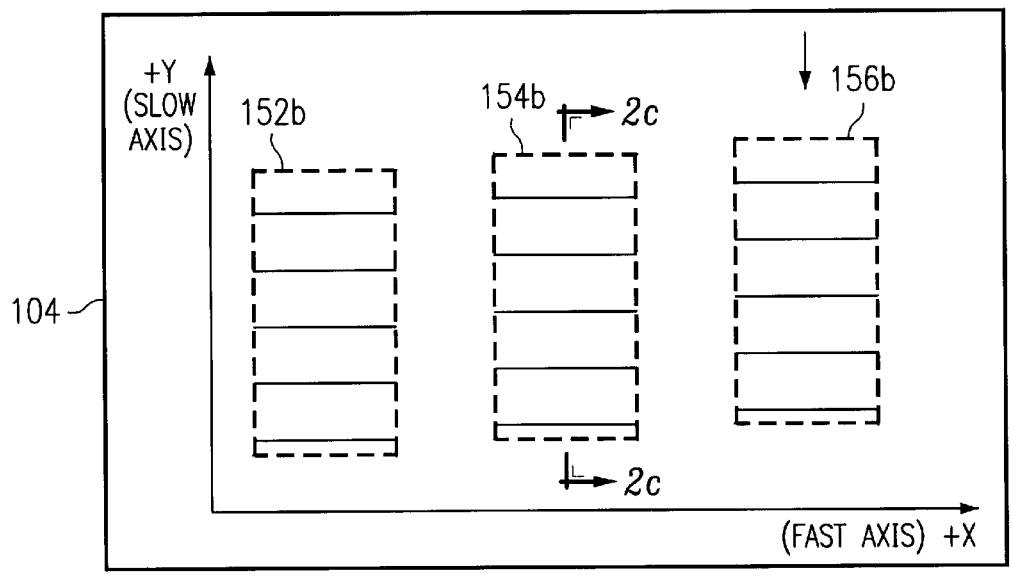
Figure 2C:
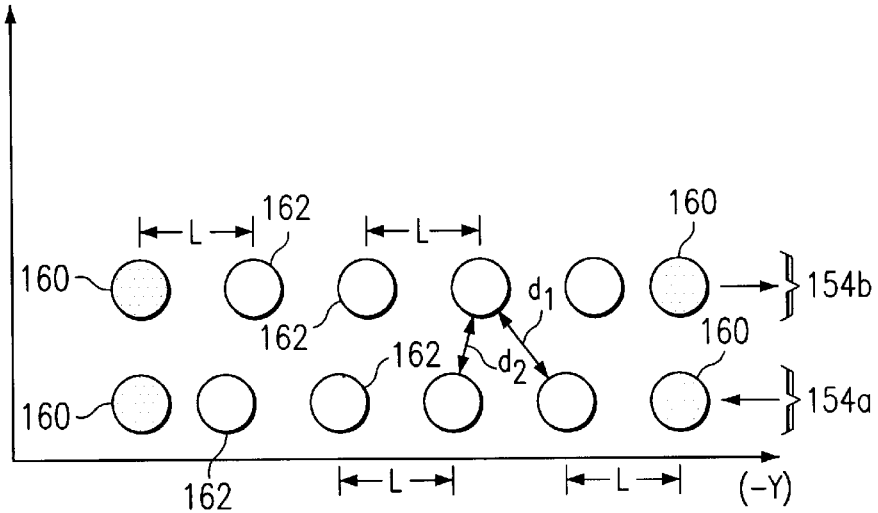
FIG. 2c is a cross-sectional view of one of the articles illustrated in FIGS. 2a and 2b, according to conventional selective laser sintering.

As will become apparent from the following description, the present invention is beneficial when applied to rapid prototyping systems that utilize lasers in the fabrication of articles from computer readable representations of those articles, such as those created by computer-aided-design (CAD) or computer-aided-manufacturing (CAM) systems. It is contemplated that the present invention is particularly beneficial when applied to rapid prototyping methods that are based upon a thermal mechanism. As is well-known in the art, selective laser sintering is a rapid prototyping approach that uses a thermal mechanism to form the article, in that particles of powder in selected locations of each of a sequence of layers are fused to one another at locations that receive laser energy. The fusing or binding of particles at the selected locations takes place through sintering (in its traditional sense), melting and resolidification, initiation of a chemical reaction (including thermosetting), or some other thermally based mechanism; for purposes of this description, and as consistent in the rapid prototyping field, all of these mechanisms will be referred to as "sintering". Accordingly, the following description will be directed to a selective laser sintering system. It is of course to be understood that the present invention may be used to benefit in other types of rapid prototyping systems that involve a thermal mechanism.

Fabrication of a cross-section of the desired article or articles is effected by laser 110, which provides a beam which is directed by scanning system 142 in the manner described in the U.S. Patents referred to hereinabove and as will now be described relative to FIG. 3. Laser 110 includes, in addition to a laser itself, such conventional control elements as described in the above-referenced U.S. Pat. No. 4,863,538, including for example a front mirror assembly, and focusing elements such as diverging and converging lenses. The type of laser 110 used depends upon many factors and in particular upon the type of powder that is to be sintered. For many types of conventional powders, a preferred laser is a 100 watt $CO_2$ type laser with controllable power output, although lasers having as low as 25 watt power output are useful with some materials. Laser 110, when on, emits laser beam 105 that travels generally along the path shown by the arrows in FIG. 3.

Computer 140 and scanning system 142 control the direction of laser beam 105 as it impinges target surface 104. In this preferred embodiment of the invention, computer 140 includes a controlling microprocessor for scanning system 142 and further includes a system for storing a computer readable representation of the article or articles being produced, such as a CAD/CAM database or data files generated from such a database, at least in slice-by-slice form if not in entirety, to define the dimensions of the article or articles being produced. A conventional personal computer workstation, such as a microprocessor-based personal computer that includes floating point capabilities, is suitable for use as computer 140 in the preferred embodiment of the invention. Computer 140 generates signals on lines AIM to scanner processor 103, in scanning system 142, to direct laser beam 105 across target surface 104 according to the cross-section of the article to be produced in the current layer of powder. Laser power control system 150 controls the power of laser 110 in response to control signals from computer 140 and feedback signals from scanner processor 103; an example of advanced laser power control that may be used in connection with this embodiment of the invention is described in the above-incorporated U.S. Pat. No. 6,151, 345.

Scanning system 142 includes prism 144 for redirecting the path of travel of laser beam 105; the number of prisms 144 necessary for directing laser beam 105 to the proper location is based on the physical layout of the apparatus. Alternatively, as is well known in the art, one or more fixed mirrors can be used in place of prism 144 for directing laser beam 105, depending upon the particular layout of system 100. Scanning system 142 further includes a pair of mirrors 146, 147, which are driven by respective galvanometers 148, 149. Galvanometers 148, 149 are coupled to their respective mirrors 146, 147 to selectively orient the mirrors 146, 147 and control the aim of laser beam 105. Galvanometers 148, 149 are mounted perpendicularly to one another so that mirrors 146, 147 are mounted nominally at a right angle relative to one another. Scanner processor 103 in scanning system 142 controls the movement of galvanometers 148, 149 to control the aim of laser beam 105 within target surface 104, in response to the signals on lines AIM from computer 140 that are generated according to the computer readable representation produced from a CAD/CAM data base, which defines the cross-section of the article to be formed in the layer of powder at target surface 104. Other scanning systems may alternatively be used in connection with this invention, including, for example, an x-y gantry system that delivers energy beams by way of a fiber optic cable.

Referring now to FIG. 4, the operation of computer 140 in controlling laser beam 105 according to the preferred embodiment of the invention will be described in detail. This operation begins with several processes in which parameters are established for a given build cycle. As known in the art, a build cycle refers to a cycle of operation of the system of FIG. 3, in which one or more articles are formed in layerwise fashion in one instance of part bed 107. For this build cycle, as conventional in the art, the desired powder material is selected by the human user. Computer 140 in turn reads a file to load various build parameters such as laser power, part bed temperature, and the like.

In process 196, the user of system 100 enables the interleaved fill process of the preferred embodiment of the invention, for example by setting a flag in computer 140. Upon enabling interleaved fill, the user of system 100 then sets, in process 198, a value for fill scan spacing parameter L, which is then stored by computer 140 for the build cycle. Fill scan spacing parameter L is the spacing between adjacent fill scan traces in the raster scanning of the powder in this build cycle. According to this embodiment of the invention, fill scan spacing parameter L is the pitch, or distance between corresponding points of adjacent ones, of the raster scans; for example, fill scan spacing parameter L corresponds to a centerline-to-centerline distance between adjacent scans. Alternatively, fill scan spacing parameter L may be specified as a spacing (generally negative spacing, indicating overlap) between adjacent scan lines, considering the spot size of laser beam 105. As will also be described in further detail below, fill scan spacing parameter L is selected to ensure adequate structural strength of the resulting article, and depends upon many parameters of the build cycle, but primarily upon the layer thickness. Other important parameters that can affect fill scan spacing parameter L are the characteristics of the powder material, the laser energy being delivered (i.e., the laser power and scan rate), the chamber temperature, and the desired density of the resulting article. For example, some materials, such as NYLON-based powders, are fully melted in the selective laser sintering process, while other materials, such as polymer-coated steel and amorphous polymers, are fused only at the perimeters of the powder particles. It is contemplated that those skilled in the art having reference to this specification can readily derive the fill scan spacing parameter L, for a given material and set of sintering conditions, through rudimentary experimentation. It is contemplated that the fill scan spacing parameter L will generally have a value of on the order of a few tenths of a millimeter.

In process 200, the human user of system 100 arranges, with the assistance of computer 140, the articles to be fabricated within part bed 107. Typically, the articles to be fabricated are arranged to maximize the number of articles that can be fabricated in a single build cycle. In process 202, computer 140 loads the desired layer thickness based on an input from the user. These preparatory processes 196, 198, 200, and 202 may, of course, be performed in any order.

Prior to process 204 of FIG. 4, computer 140 receives a computer readable representation of the articles to be formed in the current selective laser sintering build cycle. In process 204, computer 140 generates the set of outline and fill vectors to be traced in a given layer of powder, referenced to a coordinate system of part bed 107. According to the preferred embodiment of the invention, process 204 is carried out in real-time during the build itself, for example by generating the vectors for each layer immediately prior to its selective laser sintering, or alternatively in a pipelined manner preparing the vectors for the next layer during the selective laser sintering of a prior layer. Further in the alternative, the generation of the vectors in process 104 may be performed as a batch operation, for all layers in the build cycle prior to initiating selective laser sintering. In addition, all or part of process 204 may be performed by computer 140 in system 100, or alternatively by a separate off-line computer. For purposes of this description, process 204 will be described as performed by computer 140 for each layer k, immediately prior to the selective laser sintering of that layer FIG. 5 illustrates, in further detail, the operation of process 204 according to the preferred embodiment of the invention. As will be noted below, according to the preferred embodiment of the invention, the fill scans for each layer are generated substantially one at a time, for the current (or next) layer of powder that is to be selectively sintered by laser beam 105. To conserve memory, therefore, process 222 is first performed, according to the preferred embodiment of the invention, to discard the stored fill scans for a previous layer from the memory of computer 140, once those stored fill scans have been used in selective laser sintering. The layer for which the fill scans are discarded may be the immediately prior layer to the current layer, or may be for a layer even further back in the process, depending upon the memory resources of computer 140 and any "pipelining" of the vector generation that is implemented. In process 224, computer 140 then effectively "slices" the arranged volumetric CAD representations of the articles to be formed in the build cycle for a given layer of powder to be selectively sintered (the current layer having the index k), thus defining the cross-sections of the articles in that layer (k), and defining the positions of those cross-sections within the corresponding layer (k) with respect to the coordinate system of part bed 107.

Once the positions of the cross-sections within part bed 107 are known for current layer k, computer 140 then derives the vectors to be traced by laser beam 105 in that layer. As known in the selective laser sintering art, each cross-section of the article may be formed by a raster scan of the interior region only, or by a raster scan of the interior in combination with a vector tracing of the outline of the cross-section. Such vector outlining can improve the accuracy of the article and also provide a smoother surface texture of the article, particularly for some materials. If vector outlining is to be performed for one or more articles in the build cycle, process 226 is performed by computer 140 to derive and store the vectors in layer k to be traced by laser beam 105 when outlining each cross-section.

According to the preferred embodiment of the invention, the positions of the fill scans, for the raster scanning of the interior of article cross-sections to be sintered, are interleaved from layer to layer. Accordingly, decision 227 is next performed to determine whether layer k is odd-numbered or even-numbered in the overall build cycle. Of course, the layer numbering is arbitrary, as the operation of decision 227 will simply ensure interleaved fill scan generation for successive layers, as will become apparent.

For an odd-numbered layer k, process 228O is performed to set the slow scan direction for the generated fill scan vectors. In this example, considering the sintered layer to be in the x-y plane, the +x-direction will be the so-called "fast scan" direction, which is the direction in which laser beam 105 travels in making a single raster scan. The "slow scan" direction, namely the direction in which laser beam 105 increments from scan-to-scan, will be either in the +y direction or −y direction, depending upon the layer k. In process 228O, the slow scan direction is set to the +y direction, for odd-numbered layer k.

Figure 6A:
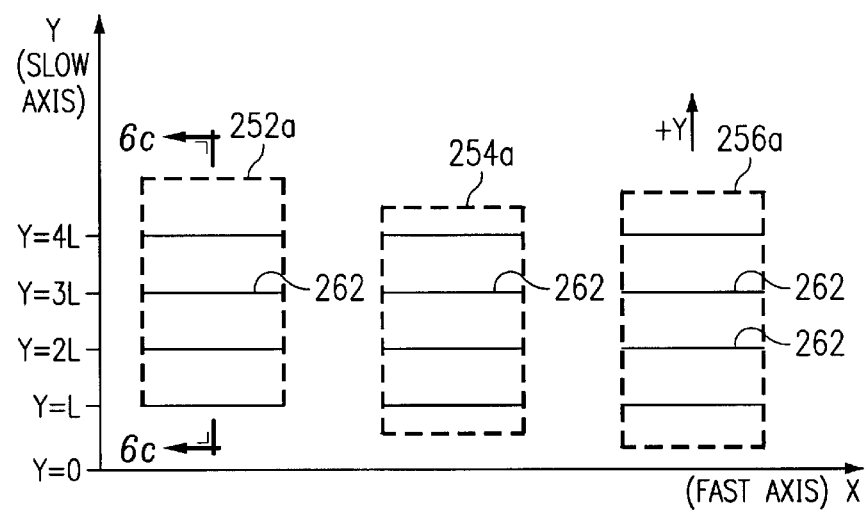
FIGS. 6a and 6b are plan views.

Process 230O is then performed by computer 140, to arrange the position of fill scans within odd-numbered layer k. According to this exemplary implementation, these positions are based on the coordinate reference of y=0, as will now be described relative to FIG. 6a. As shown in this FIG. 6a, three article cross-sections 252a, 254a, 256a are being formed in layer k=a (a being odd-numbered). The outlines of article cross-sections 252a, 254a, 256a are shown as dashed lines in this example. Fill scans 262 are defined by computer 140 in process 230O. In the example of FIG. 6a, fill scans 262 are located at multiples of fill scan spacing parameter L from the y=0 axis, with fill scans 262 potentially located at y=0, y=L, y=2L, . . . , y=mL (of course, negative multiples of L are also permitted, depending upon the arbitrary location of y=0 in the x-y coordinate plane of part bed 107). Of course, if no article cross-section is intersected along a line that is a multiple of L in the coordinate plane, as in the case of y=0 in FIG. 6a, then no fill scan 262 will be defined for that line. Each fill scan 262 is not only defined, in process 230O, with respect to its line position in the y-dimension, but also with its start and stop points along that line in the x-dimension, with the start and stop points corresponding to the boundaries of the article cross-section intersected by that line.

Because fill scans 262 are placed relative to an arbitrary axis y=0, the locations of fill scans 262 have no relation to the boundaries of cross-sections 252a, 254a, 256a in that layer. For example, the first (in the +y direction) fill scan 262 of cross-section 252a is very near the boundary of that article, while the first fill scan 262 of cross-section 254a is spaced apart from its boundary. These fill scans 262 are stored, in the memory of computer 140, in an ascending order corresponding to the +y slow scan direction, so that laser beam 105 increments in that direction during the actual build.

One important benefit of the present invention is apparent from FIG. 6a. Because each of fill scans 262 are defined relative to an arbitrary axis in the plane of layer k, the fill scans 262 are collinear with one another even if associated with different cross-sections and articles. As shown in FIG. 6a, each of cross-sections 252a, 254a, 256a have fill scans 262 that are located at, and only at, multiples of fill scan spacing parameter L relative to the y=0 axis.

Following the completion of the appropriate one of processes 230, control then passes to process 206 for the selective laser sintering of this layer k, as will be described below. It is useful to now consider how the fill scans in the next layer k+1 will be arranged relative to the fill scans of the current layer k. Where the previous index (k−1) was odd-numbered, the next instance of decision 227 will of course determine that the current index k is even-numbered. In process 228E, computer 140 will then set the slow scan direction to the −y direction, which is of course the opposite direction of that set by process 228O for odd-numbered layers k. In process 230E, computer 140 then derives the positions of fill scans 262. For this even-numbered layer k, however, these fill scan positions are not based on the y=0 axis, but instead are staggered by one-half the value of fill scan spacing parameter L, or L/2. This staggering places the positions of fill scans 262 for even-numbered layers k directly between (in the x-y plane) fill scans 262 for the odd-numbered layer below (and above) the current layer k.

Figure 6B:
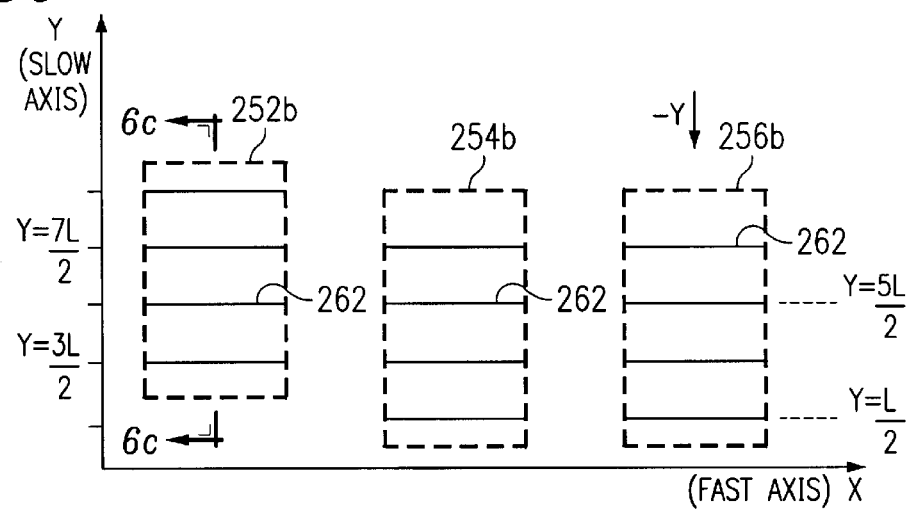

FIG. 6b illustrates the placement of fill scans 262 in even-numbered layer k=b (where b=a+1). In FIG. 6b, article cross-sections 252b, 254b, 256b are illustrated; these cross-sections 252b, 254b, 256b correspond to the next cross-section in the build from corresponding previous cross-sections 252a, 254a, 256a, respectively. Fill scans 262 in FIG. 6b are located at multiples of fill scan spacing parameter L relative to an axis y=L/2. In other words, fill scans 262 are located at y=L/2, y=3L/2, y=5L/2, . . . , y=mL+(L/2). Again, negative positions of fill scans 262 may be used, depending upon the location of the y=0 axis. As before, start and stop points along the x-dimension are also defined and stored for each fill scan 262. In addition, considering the −y slow scan direction, the vectors of fill scans 262 are ordered negatively, to be scanned in that incrementing direction during the build of the articles.

As in the case of even-numbered layer k=a, the placement of fill scans 262 in layer k=b is made without regard to the location of the boundaries of cross-sections 252b, 254b, 256b. This lack of correspondence between fill scans 262 and cross-section boundaries is evident, in FIG. 6b, by fill scans 262 being near a boundary of cross-sections 254b, 256b, but not near boundaries of cross-section 252b. In addition, fill scans 262 in different ones of cross-sections 252b, 254b, 256b are collinearly aligned with one another, because of their placement relative to the y=L/2 axis.

Figure 6C:
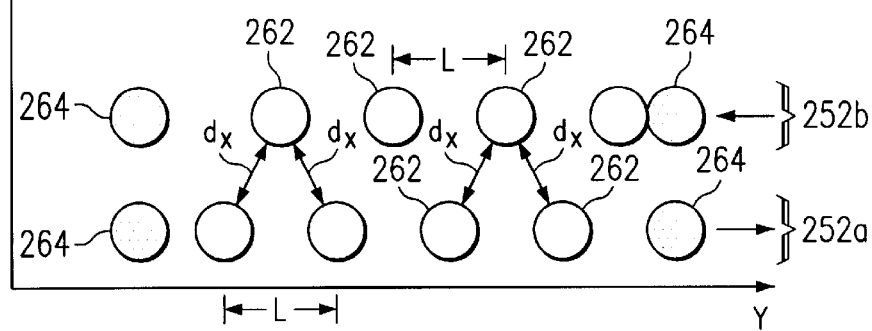
FIG. 6c is a cross-sectional view, illustrating operation of the selective laser sintering method of the preferred embodiment of the invention upon successive layers of powder.

Referring now to FIG. 6c, the relationship of fill scans 262 for two layers k=a and k=b within a single article 252 will now be described. In this cross-sectional view, both fill scans 262 and outline vectors 264 are illustrated; in this example, the boundaries of the cross-sections 252a, 252b overlie one another, as indicated by the overlying outline vectors. As noted above, FIG. 6c shows fill scans 262 schematically in a non-overlapping manner for clarity; in practice, adjacent fill scans 262 will overlap one another so that the powder at adjacent fill scans 262 will fuse together. In lower layer k=a, fill scans 262 are spaced apart from one another by the value of fill scan spacing parameter L, but the spacing of the outer fill scans 262 relative to outline vectors 264 is not specified (except that this spacing is necessarily less than the value of fill scan spacing parameter L, otherwise another fill scan 262 would be inserted). In next layer k=b, fill scans 262 are spaced apart from one another again by the value of fill scan spacing parameter L, but are at locations that are substantially between the y locations of fill scans 262 in the underlying layer k=a. Again, the locations of fill scans 262 have no relation to the boundaries of cross-section 252b, besides being within the value of fill scan spacing parameter L.

According to the present invention, in which fill scans 262 are positioned relative to an arbitrary axis in the coordinate system of part bed 107, and not relative to article boundaries, and in which fill scans 262 are staggered from layer-to-layer, the distance between adjacent fill scans 262 in successive layers is uniform. FIG. 6c illustrates fill scan 262 in layer k=b is distance $d_x$ between both of its adjacent fill scans 262 in layer k=a. This distance $d_x$ is maintained in this relationship between all adjacent fill scans 262 in successive layers. Distance $d_x$ depends only upon the layer thickness and the value of fill scan spacing parameter L, and does not depend upon the location of outline vectors 264 or the boundaries of any cross-section. The structural strength of the article depends upon fill scan distance $d_x$, as this distance determines the extent to which the selectively sintered powder in one scan fuses to that in an adjacent scan. Because of the uniformity in fill scan distance $d_x$, and its dependence upon the selectable parameters of layer thickness and fill scan spacing parameter L, the user can now directly select a value of fill scan spacing parameter L from the desired strength, without requiring large margins on this fill scan spacing parameter L to allow for a worst case inter-scan distance, as in the conventional methods. Therefore, the number of scans can be reduced from conventional methods, without affecting the structural strength of the article.

As shown in FIG. 5, upon generation of the vectors for current layer k=b, control passes to process 206 of FIG. 4 to carry out the actual article fabrication. Again, as discussed above, process 204 may be performed in real-time during the build, or may alternatively be performed as a batch operation for all layers of the build cycle prior to initiating the actual build.

Figure 3:
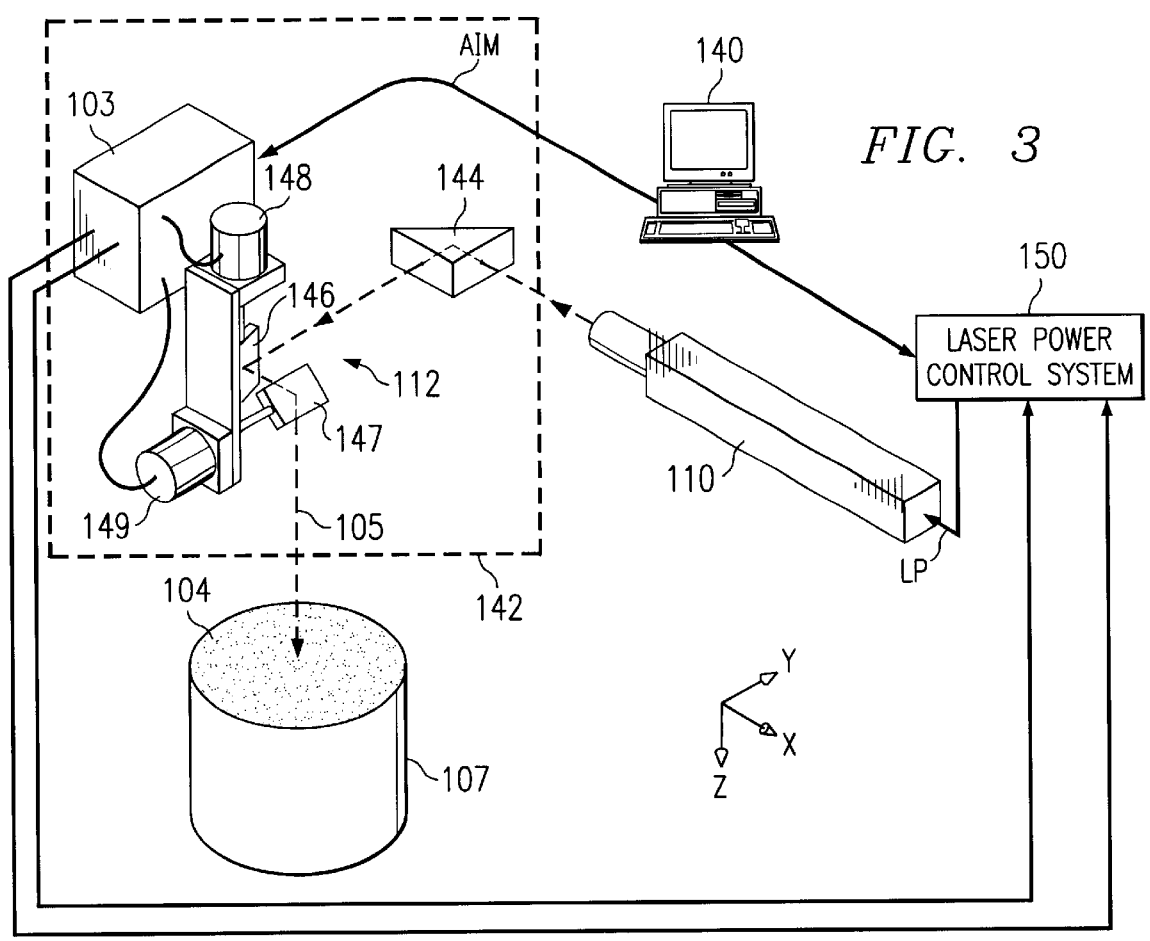
FIG. 3 is a schematic diagram, in a perspective view, of a selective laser sintering apparatus utilizing the preferred embodiment of the invention.

Referring back to FIG. 4 in combination with FIG. 3, the method of fabricating an article according to the preferred embodiment of the invention continues with the dispensing of a layer of powder at the surface of part bed 107 in process 206, for example by the translation of counter-rotating roller 118 (FIG. 1) to form the powder layer with minimal shear stress, as described in the above-incorporated U.S. Pat. No. 5,132,143. Other systems for dispensing a layer of powder may alternatively be used, including, for example, the delivery of a volume of powder from above the surface of part bed 107, and in front of a moving roller or scraper.

Once the powder is dispensed, in process 208, the current layer of powder at the surface of part bed 107 is raster scanned by laser beam 105, under the control of computer 140 and scanning system 142, according to the fill scan vectors 262 generated for that layer in process 204. As discussed above, the position of fill scans 262 according to this embodiment of the invention are based upon an axis in the coordinate system of the surface of part bed 107, and not upon the boundaries of the cross-section being formed. These scans of laser beam 105 are separated, centerline-to-centerline, by the value of fill scan spacing parameter L. Of course, considering the thermal effects of the selective laser sintering mechanism, the powder will be fused along fill scans 262 so as to form a cohesive cross-section in that layer, with this cross-section fused to previously scanned portions of the same article in underlying layers. In addition, raster scans of separate cross-sections in this current layer are collinear with one another, as described above, which assists in the rapid raster scanning of this layer. If desired, laser beam 105 is then directed by computer 140 and scanning system 142 to selectively sinter the outline of the cross-sections in the current layer of powder in process 210, if vector outlining is to be performed. Raster scanning process 208 and vector outlining process 210 may alternatively be performed in the reverse order, with vector outlining process 210 preceding raster scanning process 208.

In decision 211, following the completion of the raster scanning of all cross-sections within the current layer in process 208 and any desired vector outlining in process 210, computer 140 determines whether additional layers remain to be selectively sintered in the current build cycle. If so (decision 211 is YES), control passes to process 204 to generate fill vectors for the next layer; alternatively, if the fill vectors are generated in a batch process, control will pass to process 106 to dispense the next layer of powder, over the previously sintered layer. Following the eventual dispensing of powder, process 208 is then performed, if desired, to raster scan the boundaries of the cross-sections in this new layer, by laser beam 105.

In the next instance of process 208, the current layer of powder is scanned by laser beam 105 according to fill scans 262 derived in process 204 for that layer. As described above, the raster scans in this layer will be spaced between the scans in the previous layer, and will be carried out in the opposite slow-scan direction from that of the previous layer. This raster scanning ensures that the distance between adjacent scans in successive layers is uniform, as described above.

The process continues, via optional vector outlining process 210 and decision 211, until the build cycle is complete (decision 211 is NO). Cool down of part bed 107 with the sintered article or articles therein is then carried out as appropriate for the material used, followed by removal of the loose powder from around the articles. Post processing, such as an anneal or infiltration of the articles with another material to improve the properties of the article, is then performed as desired.

The present invention provides important advantages in selective laser sintering. Because the fill scan spacing between adjacent raster scans can now be selected with a high degree of confidence relative to the resulting article strength, it has been observed, in connection with the present invention, that fewer fill scans will be required to form an article of the desired structural strength. In some cases, a reduction by a factor of two can be achieved. Not only does this provide a more uniformly fabricated article, but because the build time in each layer is dominated by the number of fill scans, this reduction in the number of raster scans greatly reduces the time required to build articles by selective laser sintering.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of fabricating a three-dimensional article, comprising the steps of:

dispensing a first layer of a powder at a target surface;

scanning an energy beam at selected locations of the first layer of powder corresponding to a cross-section of the article, in a first plurality of parallel scan lines, adjacent ones of the first plurality of parallel scan lines having a selected pitch and at positions of the first layer of powder defined relative to a coordinate axis of the target surface;

then dispensing a second layer of powder over the first layer;

scanning the energy beam at selected locations of the second layer of powder corresponding to another cross-section of the article, in a second plurality of parallel scan lines, adjacent ones of the second plurality of parallel scan lines at the selected pitch, the second plurality of parallel scan lines being parallel to the first plurality of parallel scan lines and at positions of the second layer of powder that are offset from the positions of the first plurality of parallel lines by approximately one-half the selected pitch; and repeating the dispensing and scanning steps for pluralities of first and second layers of powder to form the article.

2. The method of claim 1, further comprising:

after the dispensing of the first layer of powder, directing the energy beam at locations of the first layer of powder corresponding to an outline of the cross-section of the article in that layer; and after the dispensing of the second layer of powder, directing the energy beam at locations of the second layer of powder corresponding to an outline of the cross-section of the article in that layer.

3. The method of claim 1, wherein the first and second pluralities of scan lines are parallel to a coordinate axis in the coordinate plane;

wherein the step of scanning an energy beam at selected locations of the first layer of powder scans the energy beam along the first plurality of parallel scan lines in a manner advancing, from scan line to scan line, in a first direction perpendicular to the coordinate axis;

and wherein the step of scanning an energy beam at selected locations of the second layer of powder scans the energy beam along the second plurality of parallel scan lines in a manner advancing, from scan line to scan line, in a second direction opposite to the first direction.

4. The method of claim 1, further comprising:

before the step of dispensing the first layer, receiving a computer-readable representation of the article to be formed; and before each scanning step, operating a computer to derive, from the computer-readable representation, a plurality of vectors for the corresponding layer, corresponding to one of the first and second pluralities of scan lines to be scanned in the scanning step for that layer; and storing the derived vectors in computer memory.

5. The method of claim 4, wherein the operating step comprises:

storing, in computer memory, a fill scan spacing value as the selected pitch;

for each layer in the pluralities of first and second layers, performing the steps of:

defining the position of at least one cross-section to be formed in the layer;

determining whether the layer is to be associated with the first plurality of layers or the second plurality of layers;

responsive to the layer being associated with the first plurality of layers, deriving vectors corresponding to the intersection of the at least one cross-section with lines in the coordinate system disposed at multiples of the fill scan spacing value relative to the coordinate axis; and responsive to the layer being associated with the second plurality of layers, deriving vectors corresponding to the intersection of the at least one cross-section with lines in the coordinate system that are offset from the positions of the vectors associated with the first plurality of layers by approximately one-half of the fill scan spacing value.

6. The method of claim 5, further comprising:

responsive to the layer being associated with the first plurality of layers, setting a slow scan direction to a first direction; and responsive to the layer being associated with the second plurality of layers, setting the slow scan direction to a second direction opposite to the first direction.

7. The method of claim 5, further comprising:

for each layer in the pluralities of first and second layers, deriving outline vectors corresponding to the outline of the at least one cross-section in that layer.

8. The method of claim 1, wherein the method simultaneously fabricates a plurality of articles;

and wherein each of the scanning steps scans energy beam at selected locations of the layer of powder corresponding to a plurality of cross-sections, each associated with one of the plurality of articles.

9. The method of claim 8, wherein one or more parallel scan lines of the first plurality of parallel scan lines that are associated with a first one of the plurality of cross-sections are collinear with one or more parallel scan lines of the first plurality of parallel scan lines that are associated with a second one of the plurality of cross-sections.

10. An apparatus for fabricating a three-dimensional object, comprising:

a powder delivery system, for applying successive layers of powder;

a laser for generating a laser beam;

a scanning system, for controllably directing the laser beam to a target plane at the surface of a layer of powder; and a computer, coupled to the scanning system, and programmed to perform a plurality of operations comprising:

storing, in computer memory, a fill scan spacing value; and controlling the scanning system to scan the energy beam in first and second pluralities of parallel scan lines within selected locations of alternating layers of powder corresponding to a cross-section of the article in that layer;

wherein adjacent ones of the first and second pluralities of parallel scan lines are at a selected pitch corresponding to the stored fill scan spacing value, and are at positions defined relative to a coordinate axis of the target plane;

and wherein adjacent ones of the second plurality of parallel scan lines are parallel to the first plurality of parallel scan lines at positions that are offset from the positions of the first plurality of parallel lines by approximately one-half the selected pitch.

11. The apparatus of claim 10, further comprising:

a moveable part piston for supporting the successive layers of powder, the moveable part piston operable to move away from the scanning system between the applying of successive layers of powder, so that the target plane formed by each newly-applied layer of powder is at substantially the same distance from the scanning system.

12. The apparatus of claim 10, wherein the computer is also programmed to control the scanning system to direct the laser beam to the target plane of each layer of powder around an outline of the cross-section formed in that layer.

13. The apparatus of claim 10, wherein the computer is also programmed to set a slow scan direction to opposite directions, perpendicular to the first and second plurality of parallel scan lines, for alternating layers of powder.

14. The apparatus of claim 10, wherein the computer is also programmed to perform a sequence of operations comprising:

before the step of dispensing a first layer, receiving a computer-readable representation of the article to be formed;

deriving, from the computer-readable representation, a plurality of vectors for each of the plurality of layers, the vectors in each layer corresponding to the one of the first or second pluralities of scan lines to be scanned in that layer; and storing the derived vectors in computer memory.

15. The apparatus of claim 14, wherein the computer is programmed to perform the deriving operation, for each of the plurality of layers, by:

defining the position of at least one cross-section to be formed in the layer;

determining whether the layer is to be associated with the first or second plurality of parallel scan lines;

responsive to the layer being associated with the first plurality of layers, deriving vectors corresponding to the intersection of the at least one cross-section with lines in the coordinate system disposed at multiples of the fill scan spacing value relative to the coordinate axis; and responsive to the layer being associated with the second plurality of layers, deriving vectors corresponding to the intersection of the at least one cross-section with lines in the coordinate system that are offset from the positions of the vectors associated with the first plurality of layers by approximately one-half of the fill scan spacing value.

16. The apparatus of claim 15, wherein the computer controls the scanning system to scan the laser beam at selected locations, of at least one layer of powder, corresponding to a plurality of cross-sections, each associated with one of a plurality of articles.

17. The apparatus of claim 16, wherein one or more parallel scan lines of a plurality of parallel scan lines that are associated with a first one of the plurality of cross-sections are collinear with one or more parallel scan lines of the plurality of parallel scan lines that are associated with a second one of the plurality of cross-sections.

* * * * *